June 8, 1954  
I. P. HARING  
2,680,341  
COTTON PICKER

Filed Dec. 7, 1951

Ivan P. Haring  
INVENTOR.

BY *James F. Weiler*

ATTORNEY

June 8, 1954  
I. P. HARING  
2,680,341  
COTTON PICKER  
Filed Dec. 7, 1951  
6 Sheets-Sheet 2

Ivan P. Haring  
INVENTOR.

BY *James F. Weiler*

ATTORNEY

June 8, 1954 — I. P. HARING — 2,680,341
COTTON PICKER
Filed Dec. 7, 1951 — 6 Sheets-Sheet 3
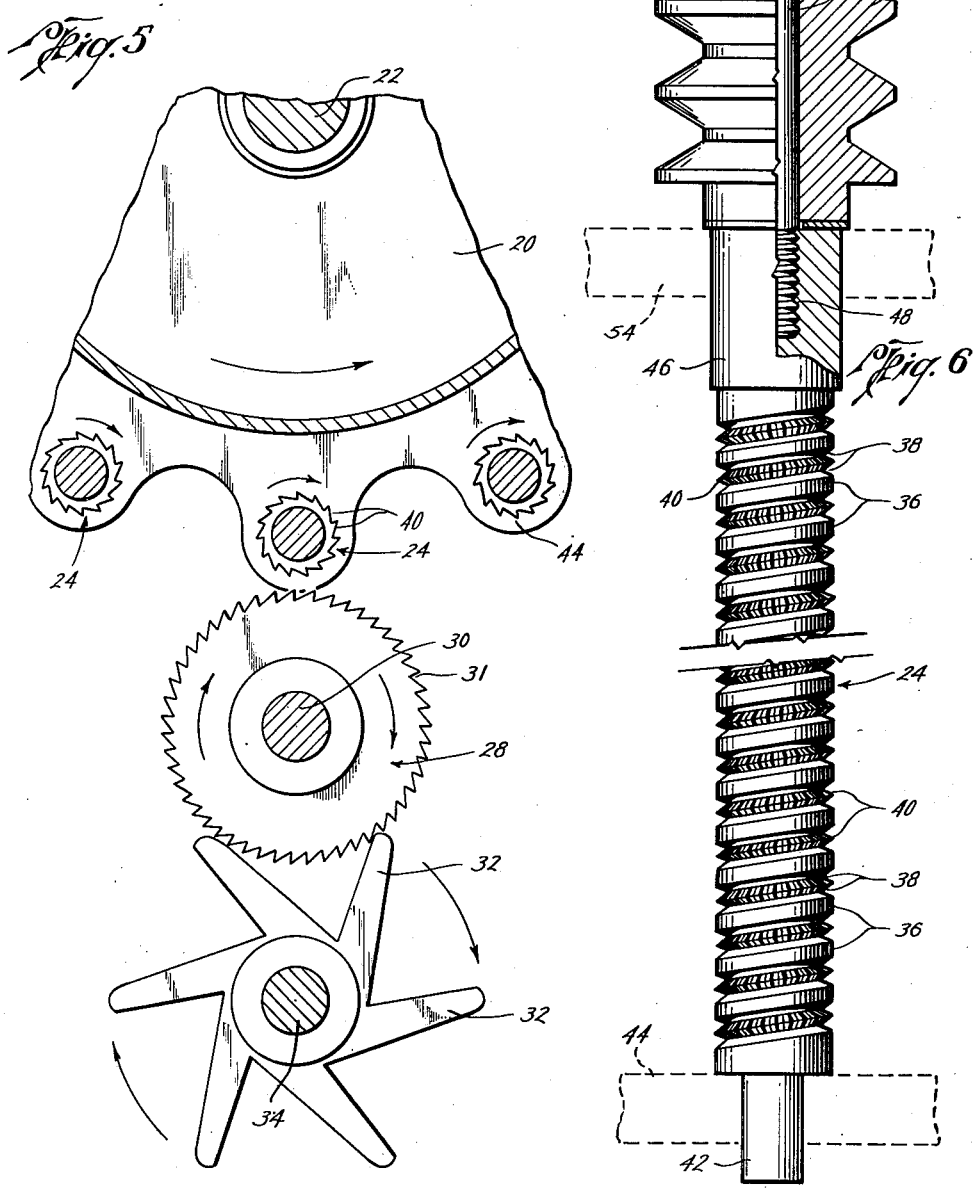
Ivan P. Haring
INVENTOR.
BY James F. Weiler
ATTORNEY

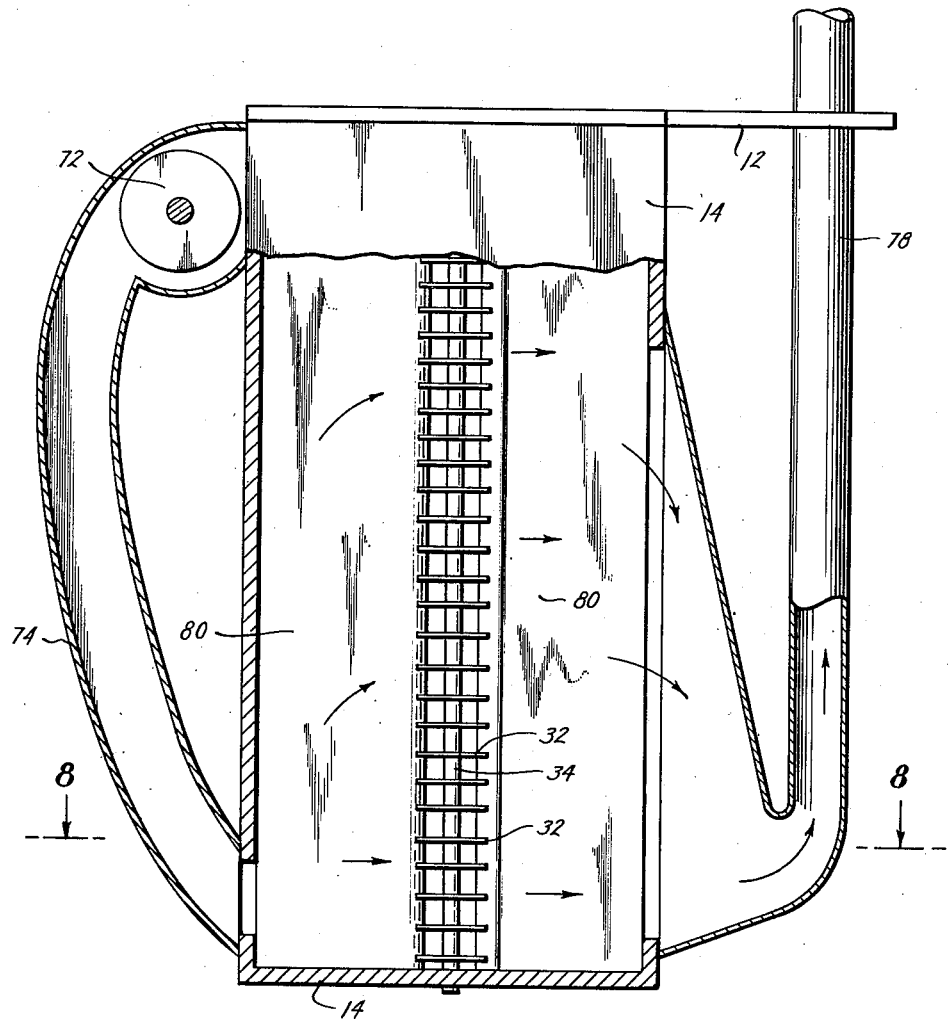

June 8, 1954   I. P. HARING   2,680,341
COTTON PICKER

Filed Dec. 7, 1951   6 Sheets-Sheet 5

Ivan P. Haring
INVENTOR.

BY James F. Weiler

ATTORNEY

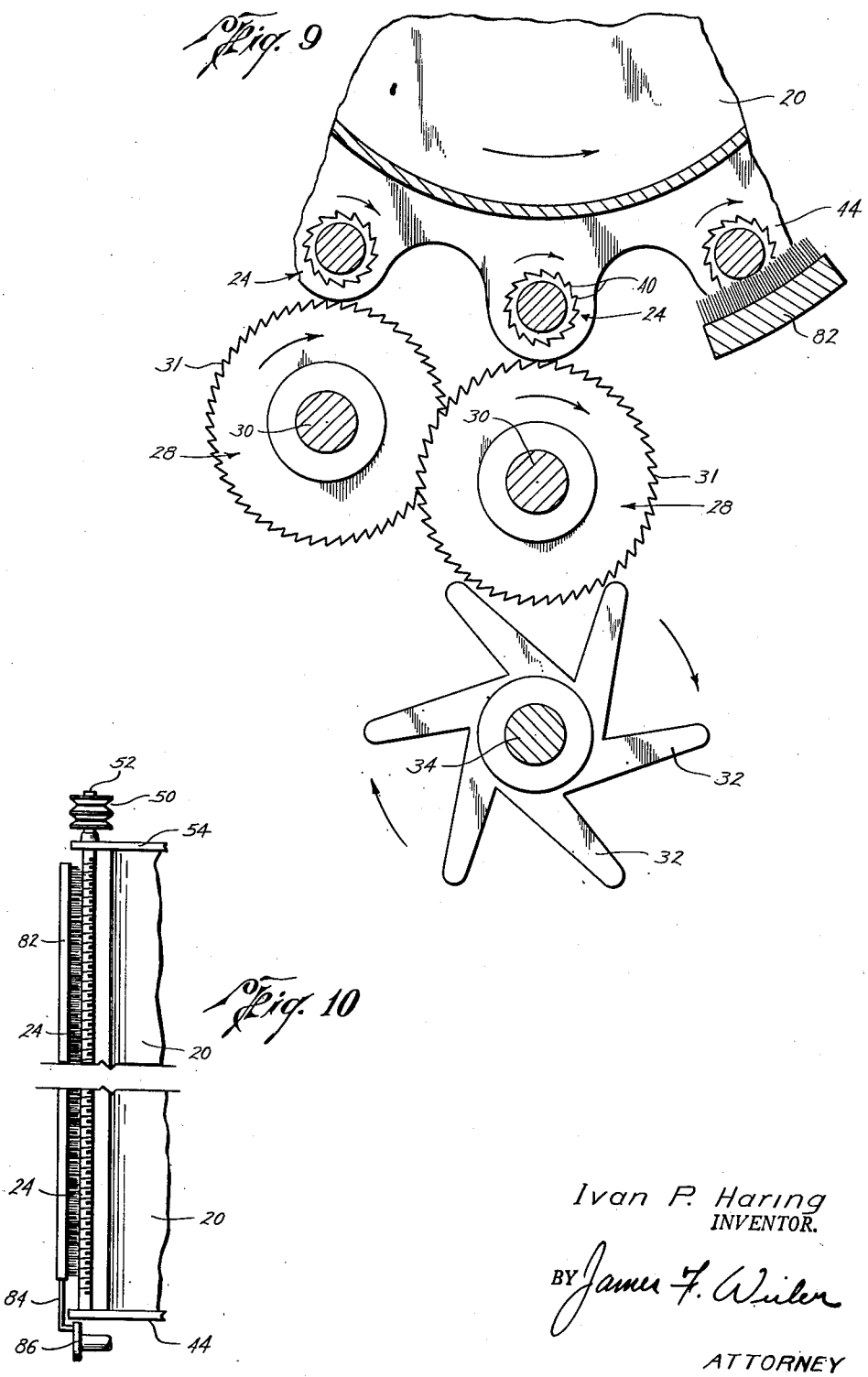

Patented June 8, 1954

2,680,341

UNITED STATES PATENT OFFICE 2,680,341

COTTON PICKER

Ivan P. Haring, Sweeny, Tex.

Application December 7, 1951, Serial No. 260,373

21 Claims. (Cl. 56—40)

This invention relates to cotton picking machines.

Many efforts over a long period of time have been made to construct a satisfactory cotton picking machine, but the practical difficulties have been numerous. In spite of all previous efforts, a cotton picking machine has not been constructed which has become an important factor in the harvesting of cotton. The reasons for this are numerous. Many of the prior cotton picking machines have been inefficient, wasteful and injure the plants and, in general, have been generally unsatisfactory. Other cotton picking machines have been unsatisfactory particularly because they are exceedingly heavy, complicated and expensive to manufacture and maintain. Still other cotton picking machines are unsatisfactory in that they moisten the spindles which remove the cotton from the plant thereby resulting in a problem of removing the moist cotton from the spindles and a resulting deterioration of the cotton for certain subsequent uses because of the moistening. Additionally, other cotton pickers are unsatisfactory in that the drums between which the cotton plants pass must be synchronized so that the side of the drum in contact with the plant moves back at approximately the same rate of speed that the machine moves forward along the row being picked.

It is a general object of the present invention to provide a cotton picking machine which overcomes disadvantages of the prior machines.

It is a specific object of the present invention to provide an efficient and successful cotton picking machine which is of exceedingly simplified construction, which is light in weight, and which may be manufactured and maintained at greatly reduced costs with respect to other cotton picking machines.

It is still a further object of the present invention to provide a cotton picking machine which efficiently picks the cotton dry but yet does not injure the plants or bolls.

A still further object of the present invention is the provision of a cotton picking machine in which it is unnecessary to synchronize the rotation of the drums between which the cotton plants pass so that the side of the drum in contact with the plant moves back at approximately the same rate of speed that the machine moves forward along the row.

A still further object of the present invention is the provision of a cotton picking machine which efficiently picks cotton from the bolls without damaging the cotton plants or picking large quantities of foliage or "trash."

A still further object of the present invention is the provision of an efficient cotton picking machine which is rugged and durable in use and which may be maintained and repaired and have parts replaced easily and readily.

Other and further objects and features will be apparent from the following detailed description of an example of the invention, given for the purpose of disclosure, and by reference to the accompanying drawings, where like character references designate like parts throughout the several views, and, where Fig. 1 is a side elevation of a cotton picker constructed in accordance with the present invention.

Fig. 5 is a fragmentary view, partly in section, illustrating the removal of cotton from the spindles by a doffer assembly, Fig. 6 is an enlarged side elevation, partly in section, illustrating a preferred picking spindle.

Figure 8:
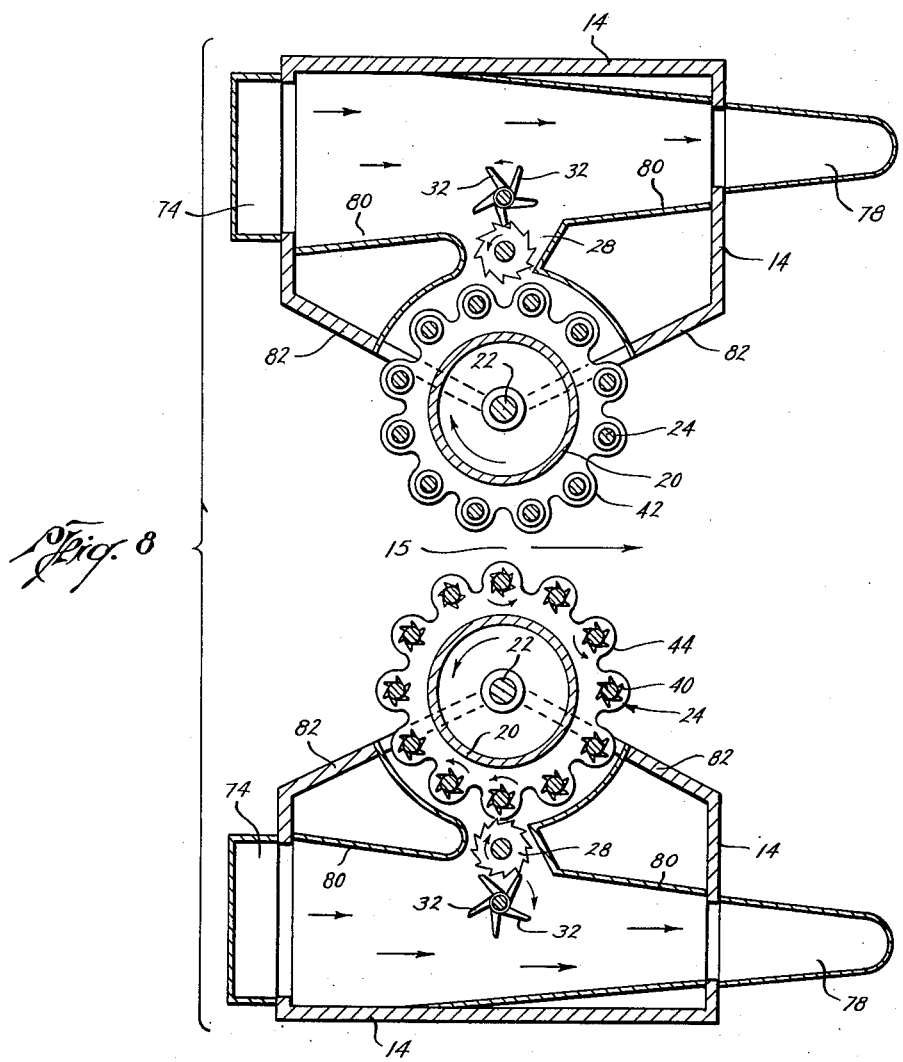

Fig. 7 is a side elevation, partly in section, illustrating means by which the cotton is removed from the doffer assembly and conveyed into a hopper, Fig. 8 is a cross-sectional view taken along the lines 8—8 of Fig. 7, Fig. 9 is similar to Fig. 5, but illustrates a modification, and Fig. 10 is a fragmentary elevation illustrating brush means to clean the spindles of cotton remaining after passing the doffer means.

In general a cotton picking machine constructed according to the present invention includes one or more drums which may be laterally spaced and which are rotatable about vertical axes between which rows of cotton plants pass as the machine moves forward and straddles the rows of cotton plants. These drums are rotated in opposite directions away from the direction of forward movement of the machines. Vertical cotton picking elements are carried by and arranged circumferentially about the peripheries of these drums and are rotatable about vertical axes independently of the drums. As these picking elements are brought into engagement with the cotton plants, which is referred to as the picking side of the drums, they engage and remove the lint from the bolls. These picking elements are carried around to what may be termed a delivery side of the drums where their rotation is reversed thereby tending to unwind the picked lint from the spindles. Doffing means are provided on the delivery side to remove the picked lint from the spindles and collecting means are provided to collect the doffed lint. As the spindles are carried away from the delivery side by the drums, their rotation is again reversed and the picking elements are again rotating to engage and pick lint from the bolls.

Figure 1:
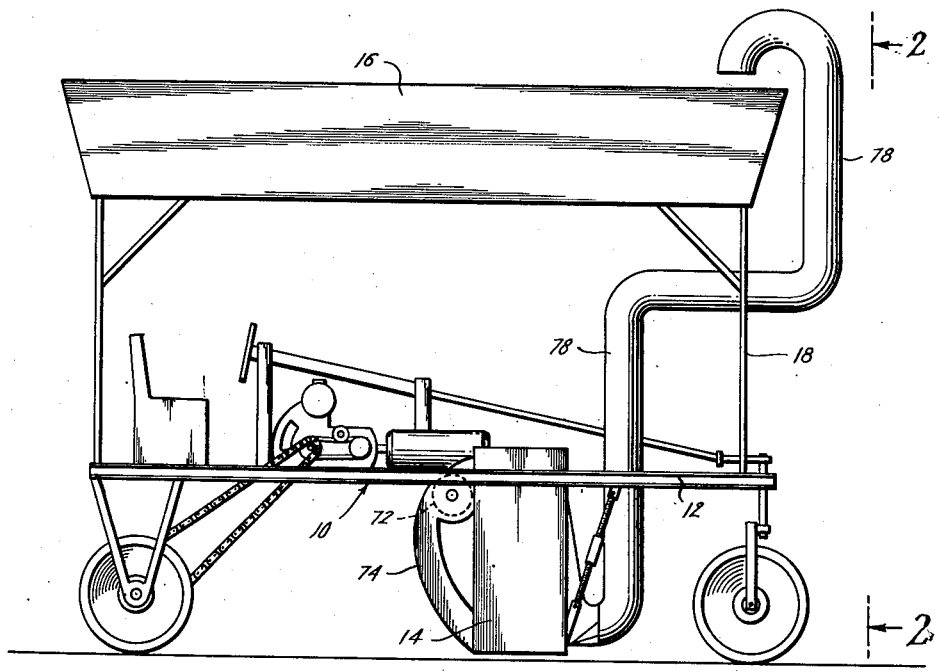
Figure 2:
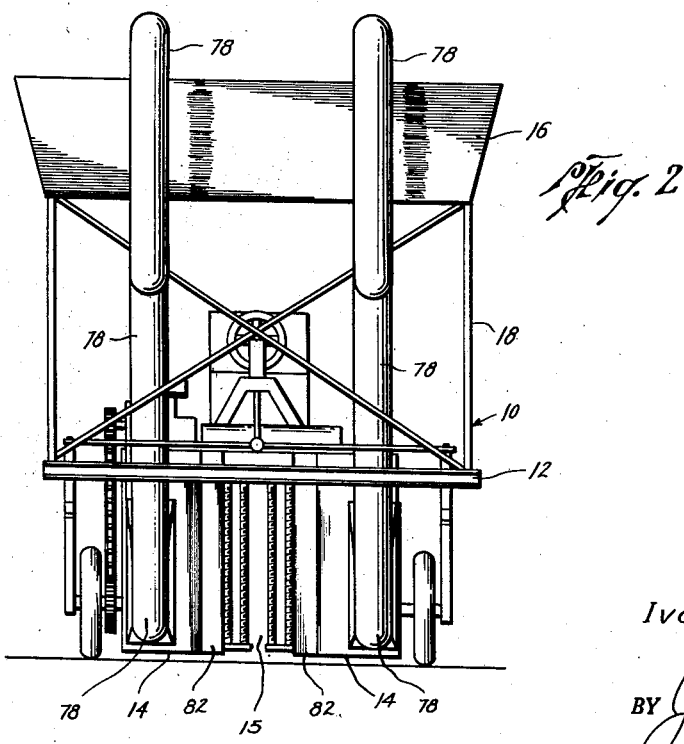
Fig. 2 is a front elevation of the cotton picker illustrated in and taken along the line 2—2 of Fig. 1.

Referring now to the drawings, and more particularly to Fig. 1, the reference numeral 10 generally designates a cotton picking device which, for the purpose of disclosure, is illustrated as being of the self propelled type. The device comprises suitable frame members 12 to which is secured the housings or casings 14 of the cotton picking and delivering elements and to which is secured the hopper 16 by means of suitably braced supports 18. As better seen in Fig. 2, the casings 14 housing cotton picking and delivery elements of the device 10 are two opposed elements having a longitudinal tunnel 15 through which rows of cotton plants being picked may pass and be straddled by the machine. The elements illustrated in Figs. 1 and 2 are conventional and no detailed description of the means to propel the device, support the hopper, direct the plants into the tunnel 15 and the like are deemed necessary.

Figure 3:
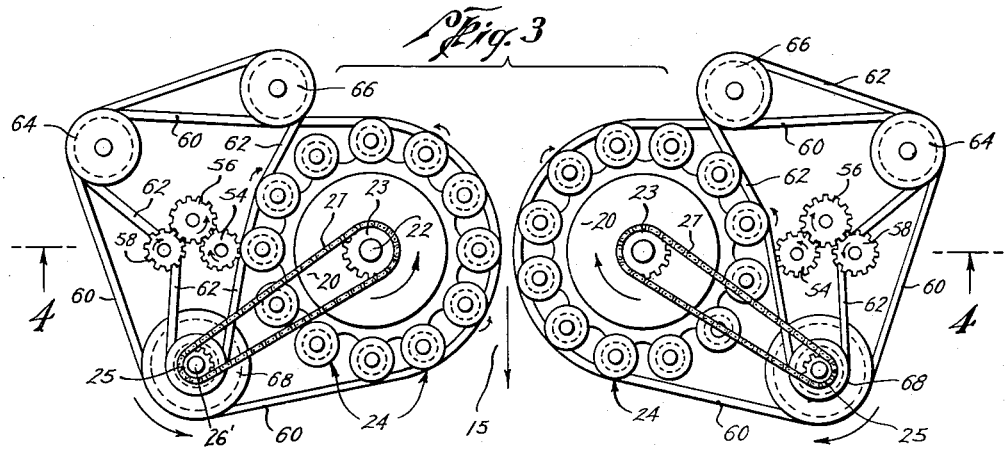
Fig. 3 is a top view of the drums and spindles, and illustrates an example of how the picking and delivery elements may be actuated.
Figure 4:
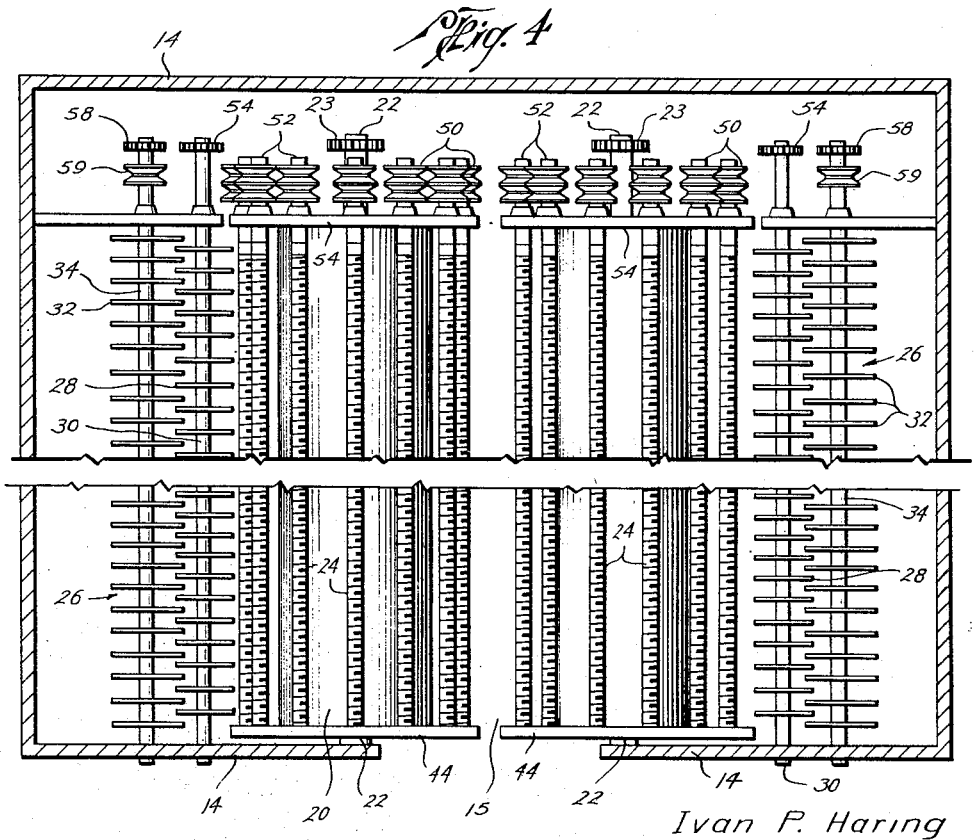
Fig. 4 is a fragmentary view of the picking unit taken along the line 4—4 of Fig. 3.

Referring to Figs. 3 and 4, the cotton picking elements comprise a pair of laterally spaced and opposed drums 20 which are rotatable about vertical axes 22 which rotatably secure the drums 20 to the frame members 12. Rotatably disposed about the periphery of the drums 20 are a plurality of vertically disposed spindles or cotton picking elements 24. Thus, the drums 20 rotate in opposite directions about vertical axes away from the line of forward progress of the machine and the spindles 24 independently rotate about their own vertical axes as they are rotated by the drums 20 about the axes 22 of the drums. On the opposite or delivery sides of each drum 20 from the picking sides or that through which the cotton plants pass doffer assemblies generally indicated by the reference numeral 26 are provided. The doffer assemblies 26 each comprise a plurality of horizontal saws 28 secured to vertically and rotatably disposed shafts 30, and as the saws 28 are rotated they engage the lint and doff it from the spindles 24. An ejector 32 secured to the vertically rotatable shaft 34 in turn removes the doffed cotton from the saws 28. Thus, as will be described in more detail later herein, as the cotton rows pass between the opposed drums 20 the lint is picked from bolls by the spindles 24, which lint is removed from the spindles 24 at the delivery side of the drums 20 by the doffer assembly 26.

A satisfactory spindle or cotton picking element for use in the present invention is illustrated in Fig. 6 where the spindle 24 is shown as having a series of circumferential smooth faced spacing or guard elements 36 alternating with the circumferential grooves 38 disposed on each side of the circumferential teeth 40. The teeth 40 are illustrated as extending outwardly the same distance as the spacing or guard elements 36; however, the teeth may extend outwardly slightly greater or less than the spacing elements 36. The arrangement illustrated in Fig. 6, however, has proved satisfactory in use. Also, while the spacing elements 36, circumferential recesses 38 and teeth 40 are illustrated as turned on a helix, it will be understood that these elements may be provided at right angles or any desired angle to the axis of the spindle; however, the arrangement illustrated is easy and inexpensive to manufacture and is satisfactory in use.

The lower ends 42 of the spindles 24 are reduced and rotatably journaled in the peripheral flanges 44 at the lower ends of the drums 20. The heads of the spindles 24 are slightly enlarged, as at 46 and have the threaded counterbores 48 by which double pulleys 50 are preferably threadedly secured to the spindles 24 by means of the bolts 52. In addition, the upper flanges 54 rotatably receive the heads 46 and, thus, the spindles 24 are rotatably secured to the drums 20. It will be noted that while the double pulleys 50 are illustrated as being threaded to the spindles 24, that they may be made integral therewith or secured to the spindles 24 in any suitable manner, such as by welding and the like. In addition, suitable bearings and the like may be provided, but are omitted to simplify the disclosure.

In operation, as the spindles 24 are rotated in contact with the cotton plants, the smooth portions 36 will prevent damage to the plants and picking of leaves and the like, while the teeth, which are inclined in the direction of rotation, will engage the lint and pull it from the bolls. The cotton winds about the spindles 24 and is held thereon by tension of the cotton against the vertical cylindrical drums 20 and the winding action of the spindles.

As indicated heretofore the doffer assemblies preferably have a series of vertically spaced, horizontal saws 28 which rotate in the direction of the arrow (see Figs. 4 and 5) and have the teeth 31 inclined in the direction of rotation. The ejector 32 has a series of horizontal fringes which extend radially from the vertical shaft 30 and are preferably inclined in a direction away from the direction of rotation of the ejector. The fingers of the ejector overlap slightly with respect to the saws 28, and, as best seen in Fig. 4, are staggered vertically with respect to the saws 28. Thus lint doffed from the spindles by the saws 28 are removed therefrom by the ejectors 32, the elements of the doffer assemblies preferably rotating in the direction of the arrows shown in Fig. 5.

In order to provide rotation to the picking and doffing elements, and, as better seen in Figs. 3 and 4, the upper ends of the vertical saw shafts 30 are provided with gears 54 which are driven by the reversing gears 56, which reversing gears 56 in turn are driven by the driving gears 58 secured to the upper end of the ejector shafts 34. As illustrated in Fig. 3, sprocket gears 23 and 25 are secured to the upper ends of the shafts 22 and 26' and are linked by the sprocket chain 27 to provide a drive for the drums 20. The pairs of endless belts 60 and 62 provide drives for the individual spindles 24 and the doffer assemblies 26. Pulley wheels 59 (see Fig. 4) are provided at the upper ends of the ejector shafts 34 and the belts 62 driving the pulley wheels 64, 66, and 68 provide drives for the doffer assemblies and gear linkages, and also provide for reverse rotation of the spindles 24 as they pass the doffer assemblies 26, the pulley wheels 66 acting as reversing wheels. Of course, any direct drive to the drums 20 may be provided or any desired linkage and drive may be utilized. The arrangement illustrated, however, is satisfactory and also provides a greatly simplified form of gear arrangement.

The drives for the endless belts and gear linkages are provided by suitable gear linkages, not shown, from the motor of the device to one of the pulley wheels, such as 64. The provision of such a drive is conventional and may be by a chain drive and sprocket wheel or any conventional drive and no description thereof is deemed necessary.

Thus, the drums, spindles and doffer assemblies are rotated and the drums are rotated in opposite directions away from the forward progress of the machine as are the spindles 24 when they are in contact with the belt 60. When the spindles 24 come in contact with the belt 62 their rotation is reversed and, as better seen in Fig. 5, the teeth 40 are directed away from the rotation of the spindles 24 and thereby provide unwinding of the cotton on the spindles. The teeth 31 on the saws 28 are pointed in the direction of rotation and engage and doff the cotton from the spindles 24, the cotton being removed from the saws 28 by means of the ejector fingers 32.

In order to remove picked cotton from the doffer mechanism and to convey the cotton to the hopper 16, and with reference to Figs. 7 and 8, a current of air is provided by means of the pair of fans 72 which have the communicating conduits 74 extending to the rearward sides of the casings 14. Thus currents of air are provided which remove the picked cotton from the ejectors 32 and convey it in the conduits 78 to the hopper 16. The vertical wall members 80 are provided to direct the air current in the most effective manner and the casing 14 has the inwardly extending portions 82 in order to prevent cotton from being blown from the picker and to provide a deflecting plow in order to facilitate the entry of rows of cotton plants into the tunnel 15 of the machine 10. The baffling 80 and 82 are all provided by vertically extending wall members secured to the casings 14. In the arrangement illustrated, the walls 80 will permit a certain amount of leakage of air to the spindles 24 which provides a turbulence and aids in the doffing of picked lint from the spindles 24 by the doffing assemblies.

The operation of the cotton picker is as follows: As the cotton picker is moved forward (in the direction of the arrows indicated in Figs. 3 and 8), it straddles rows of cotton plants and these rows will be guided by the deflecting plows 82 into the tunnel 15 between the drums 20. The drums are rotating in opposite directions away from the forward progress of the machine and the spindles 24 are similarly rotating in a direction away from the forward progress of the machine as they engage the cotton. The circumferential teeth 40, the circumferential recesses 38 and spacing elements 36 combine to engage the plants, the spacing elements preventing the plants from being damaged and preventing foliage or "trash" from being picked. The circumferential teeth 40, being inclined in the direction of rotation of the spindles on the picking sides of the drums, pull the cotton from the bolls and wind the cotton on the spindles 24 and hold it thereon by means of tension created by the lint bearing against the face of the drum 20 as it is wound about the spindles. As the spindles reach the opposite or delivery side of the drums 20, their direction is reversed, as heretofore described, and the saws 28 remove the cotton from the spindles, inasmuch as the spindles are tending to unwind the cotton therefrom due to their reverse rotation, the teeth of the spindle being so disposed as to permit the pulling off of the cotton therefrom by the teeth 31 of the saws 28. The ejector fingers 32, which overlap slightly with the saws 28, remove the cotton from the saws 28 and the air current generated by the fans 72 aid in the removal of the cotton from the spindles 24 and from the ejectors 32 and convey the picked cotton in the conduits 78 into the hopper 16 disposed at the top of the machine. Inasmuch as the cotton is not moistened, the picked cotton may be ginned in any ordinary gin without the utilization of special and expensive equipment available only in scattered locations.

It should be particularly noted, that it is not necessary that the forward progress of the machine be synchronized with the rate of rotation of the drums 20 in order that the cotton will be stationary relative to the drums and, in view of the circumferential flat spacing elements 36, the recesses 38 and the teeth 40 the cotton is readily picked from the plants and the plants or stalks are not damaged during the picking step. In addition, it will be noted, that it is not necessary to moisten the spindles 24 in order to effect efficient picking of cotton from the plants. Inasmuch as the cotton is not moistened in picking, the doffer assembly illustrated in combination with the current of air readily removes the picked cotton from the spindles and carries it up into the hopper.

As illustrated in Figs. 9 and 10, several sets of saws 28 may be provided to remove cotton from the spindles 24. This is particularly desirable in picking plants having considerable amounts of lint. In Figure 9, the stripper saws 28 are shown as overlapping, in which event they clean one another. If desired one or more ejectors 32 may be used to remove the lint from the saws 28, or the ejectors 32 may be omitted, particularly in using a vacuum or suction system to convey the lint to the hopper 16. As illustrated in these figures, a brush 82 may be provided to engage the spindles 24 and remove any lint remaining thereon, if desired. The brush 82 is positioned on the housing 80 and preferably reciprocates vertically. This may be provided by the arm 84 secured to the brush 82 and the rotating cam 86. The cam is driven by suitable linkage, not shown. The brush 82 may be made to reciprocate in any conventional manner, or may be omitted if desired.

Thus, while the cotton picking machine has been described in some detail, it is manifest that numerous changes may be made therein. For example, any desired drive or gear linkage may be provided to provide rotation of the drums 20, spindles 24 and doffer assemblies 26. In addition, any desired air system may be provided to remove the picked cotton from the spindles and doffer assembly and convey it to the hopper 16 such as a vacuum system and the like, it is believed that the system illustrated is preferred because a vacuum system tends to suck trash and dirt into the machine. If desired, however, the air system illustrated may be reversed. Moreover, while the device is illustrated as a self propelled type, it is manifest that it may be of the trailer type and pulled by itself or in gangs of two or more, in which event, it would be preferable to provide a motor or belt arrangement to actuate the picking mechanism. Any preferred doffing assembly may be used and in picking cotton plants having considerable lint, two or more doffing assemblies for each drum may be employed if desired. It will be understood that a single drum and a compression plate may be used effectively. Additionally, the drums may be staggered and two or more used in staggered relation. If desired several pairs of drums may be employed in machines used for either picking multiple or single rows of cotton. Thus the arrangement of parts and details of construction may be considerably varied.

It seems manifest from the above disclosure that the cotton picking machine of the present invention fulfills the above objects and is considerably simplified over those of the prior art. The present development constitutes more than a mere improvement over the prior art, and provides a different principle of picking cotton by a simplified means not heretofore possible. Thus, numerous changes may be made in the details and arrangement of parts and the present invention is to be limited only by the spirit of the invention and the scope of the appended claims.

What is claimed is:

1. In a cotton-picking machine, a drum rotatable about a vertical axis and having a cylindrical face, a plurality of vertical picking elements carried by the drum and arranged circumferentially about the face thereof, said picking elements having picking teeth and being independently rotatable about vertical axes and disposed in closely-spaced relation to the face of the drum whereby cotton engaged by said picking elements is wound thereabout and held thereon by means of tension created by the cotton bearing against the face of the drum and the winding action of the picking elements, and driving means connected to said drum and to said picking elements to rotate the drum and the picking elements about a common axis and to rotate the picking elements independently of the drum.

2. In a cotton-picking machine, a drum rotatable about a vertical axis and having a cylindrical face, a plurality of vertical picking elements carried by the drum and arranged circumferentially about the face thereof, said picking elements having picking teeth and being independently rotatable about vertical axes and disposed in closely-spaced relation to the face of the drum whereby cotton engaged by said picking elements is wound thereabout and held thereon by means of tension created by the cotton bearing against the face of the drum and the winding action of the picking elements, driving means connected to said drum and the picking elements to rotate the drum and the picking elements about a common axis and to rotate the picking elements independently of the drum, and doffing means carried by the cotton-picking machine and mounted adjacent the picking elements to engage and remove the cotton therefrom.

3. In a cotton-picking machine, a drum rotatable about a vertical axis and having a cylindrical face, a plurality of vertical picking spindles carried by the drum and arranged circumferentially about the face thereof, said picking spindles having picking teeth and being independently rotatable about vertical axes and disposed in closely-spaced relation to the face of the drum whereby lint engaged by said picking elements is wound thereabout and held thereon by means of tension created by the lint bearing against the face of the drum and winding action of the picking spindles, and driving means connected to the drum and to the picking spindles to rotate the drum and the picking spindles about a common axis and to rotate the picking spindles independently of the drum.

4. In a cotton-picking machine, a drum rotatable about a vertical axis and having a cylindrical face, a plurality of vertical picking spindles carried by the drum and arranged circumferentially about the face thereof, said picking spindles having picking teeth and being independently rotatable about vertical axes and disposed in closely-spaced relation to the face of the drum whereby cotton engaged by said picking elements is wound thereabout and held thereon by means of tension created by the lint bearing against the face of the drum and winding action of the picking spindles, driving means connected to the drum and to the picking spindles to rotate the drum and the picking spindles about a common axis and to rotate the picking spindles independently of the drum, and doffing means carried by said picking machine and mounted adjacent the picking spindles to engage and remove the lint wound thereon.

5. In a cotton-picking machine, a drum rotatable about a vertical axis and having a cylindrical face, a plurality of vertical picking spindles carried by the drum and arranged circumferentially about the face thereof, said picking spindles having picking teeth and being independently rotatable about vertical axes and disposed in closely-spaced relation to the face of the drum whereby lint engaged by the picking spindles is wound thereabout and held thereon by means of tension created by the lint bearing against the face of the drum and winding action of the picking spindles, driving means connected to the drum and to the picking spindles to rotate the drum and the picking spindles about a common axis and to rotate the picking spindles independently of the drum, said driving means being so constructed and arranged to reverse rotation of the picking spindles during a portion of a revolution of the drum, and doffing means carried by the cotton-picking machine mounted adjacent the picking spindles for engaging and removing the lint wound about the picking spindles during reverse rotation thereof.

6. In a cotton-picking machine, a drum rotatable about a vertical axis and having a cylindrical face, a plurality of vertical picking spindles carried by the drum and arranged circumferentially about the face thereof, said picking spindles having picking teeth and being independently rotatable about vertical axes and closely-spaced to the face of the drum whereby lint is engaged by the picking spindles and wound thereabout and held thereon by means of tension created by the lint bearing against the face of the drum and winding action of the spindles, pulley wheels on the picking spindles, and an endless driving belt engaging said pulley wheels to rotate said drum and said picking spindles about a common axis and said spindles independently of the drum.

7. In a cotton-picking machine, a drum rotatable about a vertical axis and having a cylindrical face, a plurality of vertical picking spindles carried by the drum and arranged circumferentially about the face thereof, said picking spindles having picking teeth and being independently rotatable about vetrical axes and disposed in closely-spaced relation to the face of the drum whereby cotton engaged by the picking spindles is wound thereabout and held thereon by means of tension created by the cotton bearing against the face of the drum and winding action of the picking spindles, double pulley wheels on the picking spindles, a first endless driving belt engaging a first set of the double pulley wheels to rotate said picking spindles in one direction during a portion of a revolution of the drum and when the picking spindles are engaging and picking the cotton, and a second endless driving belt engaging a second set of the double pulley wheels during a portion of the revolution of the drum and when the first belt is not engaging the first set of double pulley wheels for reversing rotation of the picking spindles.

8. In a cotton-picking machine, a drum rotatable about a vertical axis and having a cylindrical face, a plurality of vertical picking spindles carried by the drum and arranged circumferentially about the face thereof, said picking spindles having picking teeth and being independently rotatable about vertical axes and disposed in closely-spaced relation to the face of the drum whereby cotton engaged by the picking spindles is wound thereabout and held thereon by means of tension created by the lint bearing against the face of the drum and winding action of the picking spindles, driving means connected to the drum and to the picking spindles to rotate the drum and the picking spindles about a common axis and to rotate the picking spindles independently of the drum, and doffing means carried by the cotton-picking machine and arranged to engage cotton wound on the picking spindles, said doffing means comprising horizontal saws rotatable about a vertical axis and mounted adjacent the picking spindles to engage and doff the picked cotton therefrom and horizontal ejectors carried by the picking machine and mounted adjacent the horizontal saws, said ejectors being rotatable about a vertical axis to engage and remove the doffed cotton from the saws.

9. In a cotton-picking machine, a drum rotatable about a vertical axis and having a cylindrical face, a plurality of picking spindles carried by the drum and arranged circumferentially about the face thereof, said picking spindles having picking teeth and being independently rotatable about vertical axes and disposed in closely-spaced relation to the face of the drum whereby lint engaged by the picking spindles is wound thereabout and held thereon by means of tension created by the lint bearing against the face of the drum and winding action of the picking spindles, first driving means connected to the drum and to the picking spindles to rotate the drum and the picking spindles about a common axis and to rotate the picking spindles independently of the drum; doffing means carried by the machine and comprising horizontal saws rotatable about a vertical axis and mounted adjacent outer surfaces of the picking spindles to engage and doff cotton wound about the picking spindles and horizontal ejector fingers rotatable about a vertical axis mounted adjacent the doffing means to engage and doff the cotton from the saws, second driving means connected to the doffing means to rotate said doffing means, and third driving means connected to the picking spindles to reverse rotation of the picking spindles in the vicinity of the doffing means.

10. In a cotton-picking machine, a drum rotatable about a vertical axis and having a cylindrical face, vertical picking spindles carried by said drum and arranged circumferentially about the face thereof, said picking spindles having picking teeth and being independently rotatable about vertical axes and disposed in closely-spaced relation to the face of the drum whereby lint engaged by said picking spindles is wound thereabout and held thereon by means of tension created by the lint bearing against the face of the drum and winding action of the picking spindles, driving means connected to the drum and to the picking spindles to rotate the drum and the picking spindles about a common axis and to rotate the picking spindles independently of the drum, doffing means carried by the machine and mounted adjacent outer surfaces of the picking spindles to engage and remove picked lint from the picking spindles, and means carried by the picking machine and communicating with the doffing means to collect the doffed cotton.

11. In a cotton-picking machine, a drum rotatable about a vertical axis and having a cylindrical face, a plurality of vertical picking elements carried by the drum and arranged circumferentially about the face thereof, said picking elements being independently rotatable about verticl axes and disposed in closely-spaced relation to the face of the drum, said vertical picking elements each comprising a vertical rod, vertically-spaced circumferential teeth on the rod and circumferential recesses on each side of the teeth, and driving means connected to said drum and to said picking elements to rotate the drum and the picking elements about a common axis and to rotate the picking elements independently of the drum about their axes whereby cotton engaged by said circumferential teeth will be wound about each said rod and held thereto by tension of the cotton against the face of the drum and winding action of the rod.

12. A cotton-picking machine comprising, portable means, at least a pair of drums disposed in spaced relation and each rotatable about a vertical axis carried by said portable means, said drums having cylindrical faces and said machine having a passage for cotton plants therethrough engageable by said drums, vertical picking elements carried by the drums and arranged circumferentially about the face thereof, said picking elements having picking teeth and being independently rotatable about vertical axes and disposed in closely-spaced relation to each of the faces of the drums which carry them whereby cotton engaged by said picking elements is wound thereabout and held thereto by tension of the cotton against the face of the drum and the winding action of the picking elements, and driving means connected to said drums and to said picking elements to rotate each drum and the picking elements carried thereby about a common axis and to rotate the picking elements independently of each said drum.

13. A cotton-picking machine comprising, portable means, at least a pair of drums disposed in spaced relation and each rotatable about a vertical axis carried by said portable means, said drums having cylindrical faces and said machine having a passage for cotton plants therethrough engageable by said drums, vertical picking elements carried by the drums and arranged circumferentially about the face thereof, said picking elements having picking teeth and being independently rotatable about vertical axes and disposed in closely-spaced relation to each of the faces of the drums which carry them whereby cotton engaged by said picking elements is wound thereabout and held thereto by tension of the cotton against the face of the drum and the winding action of the picking elements, driving means connected to said drums and to said picking elements to rotate each drum and the picking elements carried thereby about a common axis and to rotate the picking elements independently of each said drum, and doffing means carried by the portable means and disposed proximate outer surfaces of the picking elements to engage and remove the cotton from the picking spindles.

14. A cotton-picking machine comprising, portable means, at least a pair of spaced drums each rotatable about a vertical axis carried by the portable means, said drums having cylindrical faces and providing a passage for cotton plants therebetween, vertical picking spindles carried by each of the drums and arranged circumferentially about each face thereof, said picking spindles having picking teeth and being independently rotatable about vertical axes and disposed in closely-spaced relation to the face of the drums which carry them whereby cotton engaged by the picking spindles is wound thereabout and held thereon by means of tension created by the lint bearing against the face of the drum and the winding action of the spindles, driving means connected to each drum and to the picking spindles to rotate each drum and the picking spindles carried thereby about a common axis and to rotate the picking spindles independently of each drum, said driving means including means to reverse rotation of the picking spindles during a portion of each revolution of each drum, and doffing means carried by the portable means and rotatably mounted adjacent outer surfaces of the picking spindles to engage and to doff the cotton from the picking spindles during reverse rotation thereof.

15. A cotton-picking machine comprising, portable means, a pair of laterally-spaced drums each rotatable about a vertical axis carried by the portable means and each having a cylindrical face, said drum providing a passage for cotton plants therebetween, vertical picking spindles carried by each of the drums and arranged circumferentially about each face thereof, said picking spindles having picking teeth and being independently rotatable about vertical axes and disposed in closely-spaced relation to the face of each of said drums which carry them whereby cotton engaged by the picking spindles is wound thereabout and held thereon by means of tension created by the cotton bearing against the face of the drum and the winding action of the spindle, driving means connected to each of the drums and to the picking spindles to rotate each of the drums and the picking spindles carried thereby about a common axis and to rotate the picking spindles independently of each of the drums, doffing means carried by the portable means and mounted adjacent outer surfaces of the picking spindles to engage and doff the cotton from said picking spindles, and casings on the portable means enclosing the doffing means and portions of each drum proximate the doffing means.

16. A cotton-picking machine comprising, portable means, a pair of laterally-spaced drums each rotatable about a vertical axis carried by the portable means, each of said drums having a cylindrical face and said drums providing a passage for cotton plants therebetween, vertical picking spindles carried by each of said drums and arranged circumferentially about each face thereof, said picking spindles having picking teeth and being independently rotatable about vertical axes and disposed in closely-spaced relation to the face of the drums which carry them whereby cotton engaged by the picking spindles is wound thereabout and held thereon by means of tension created by the cotton bearing against the face of the drum and the winding action of the picking spindles, driving means connected to each of the drums and to the picking spindles to rotate each of the drums and the picking spindles carried thereby about a common axis and to rotate the picking spindles independently of the drums, doffing means carried by the portable means and mounted adjacent outer surfaces of the picking spindles to engage and doff the cotton from the picking spindles, casings on the portable means enclosing the doffing means and portions of each of the drums proximate the doffing means, and means carried by the portable means and in communication with the casings to collect the doffed cotton from the doffing means.

17. The cotton-picking machine of claim 16 where the means to collect the doffed cotton includes fan means carried by the portable means, a hopper carried by the portable means, and conduits establishing communication of said casings with the fan means and the hopper.

18. The cotton-picking machine of claim 17 where the casings include baffle means to direct portions of aid currents generated by the fan means against each face of the drums and the doffing means.

19. A cotton-picking machine comprising, portable means, a pair of laterally-spaced drums each rotatable about a vertical axis and carried by the portable means, each of the drums having a cylindrical face and the drums providing a passage for cotton plants therebetween, vertical picking spindles having picking teeth carried by each of the drums and arranged circumferentially about each face thereof, said picking spindles being independently rotatable about vertical axes and disposed in closely-spaced relation to the face of each drum whereby cotton engaged by the picking spindles is wound thereabout and held thereon by means of tension created by the cotton bearing against the face of each of the drums and the winding action of the picking spindles, driving means connected to each of the drums and to the picking spindles to rotate each drum and the picking spindles carried thereby about a common axis and to rotate the picking spindles independently of the drums, doffing means carried by the portable means comprising horizontal saws disposed about vertical axes and proximate to outer surfaces of the picking spindles to engage and doff the cotton from the picking spindles and horizontal ejector fingers rotatable about vertical axes and disposed proximate the horizontal saws to engage and doff the cotton from the saws, said driving means including means to reverse rotation of the picking spindles in the vicinity of the doffing means.

20. A cotton-picking machine comprising, portable means adapted to straddle a row of cotton plants, a pair of laterally-spaced drums each rotatable about a vertical axis and carried by the portable means, each of the drums having a cylindrical face and the drums providing a passage for straddled cotton plants therebetween, vertical picking elements carried by each of the drums and arranged circumferentially about the face thereof, said picking elements being independently rotatable about vertical axes and disposed in closely-spaced relation to the face of the drums, said picking elements comprising vertical rods having vertically-spaced circumferential teeth and circumferential recesses on each side of the teeth so that cotton engaged by the teeth will wrap around the rods and be held by the rods by tension of the cotton between the rods and each face of the drum, doffing means carried by the portable means rotatably mounted adjacent outer surfaces of the picking elements to engage and to remove picked cotton from the vertical picking elements, first driving means connected to the drums and to the picking elements to rotate each drum and the picking elements carried thereby about a common axis and to rotate the picking elements independently of each drum, second driving means connected to the doffing means to rotate the doffing means, third driving means engaging the picking elements during a portion of each revolution of each of the drums to reverse rotation of the picking elements while the doffing means is removing cotton therefrom, casings carried by the portable means enclosing the doffing means and portions of each drum proximate the doffing means, and means carried by the portable means and in communication with the casings to collect the doffed cotton from the doffing means.

21. In a cotton-picking machine, a drum rotatable about a vertical axis and having a cylindrical face, vertical picking spindles carried by the drum and arranged circumferentially around the face thereof, said picking spindles being independently rotatable about vertical axes and disposed in closely-spaced relation to the face of the drum, said vertical-picking spindles comprising vertical rods having vertically-spaced circumferential teeth and circumferential recesses on each side of the teeth so that cotton engaged by the teeth will wrap around the rods and be held by the rods by tension of the cotton between the rods and the face of the drum and the winding action of the rods, double pulley wheels on the picking spindles, a pulley wheel on the drum, a first driving endless belt engaging the pulley wheel on the drum to rotate the drum and the vertical picking spindles carried thereby about a common axis, a second driving endless belt engaging a first set of the double pulley wheels during a portion of each revolution of the drum to rotate the picking spindles about their axes independently of the drum, a third driving endless belt engaging a second set of the double pulley wheels during that portion of each revolution of the drum when the first belt is not engaging the first set of pulley wheels to reverse rotation of the picking spindles, doffing means carried by the machine, said doffing means comprising a plurality of horizontal saws disposed on a vertical axis mounted adjacent the picking spindles during reverse rotation thereof, and a plurality of horizontal ejector fingers rotatable about a vertical axis and disposed proximate the horizontal saws to doff the cotton therefrom.

References Cited in the file of this patent

UNITED STATES PATENTS

| Number | Name | Date |
|---|---|---|
| 555,691 | Gaskill | Mar. 3, 1894 |
| 2,513,259 | Walker, Jr. | June 27, 1950 |